S. GERATT.
COMBINATION IMPLEMENT HEAD.
APPLICATION FILED JULY 27, 1914.
1,133,124.
Patented Mar. 23, 1915.
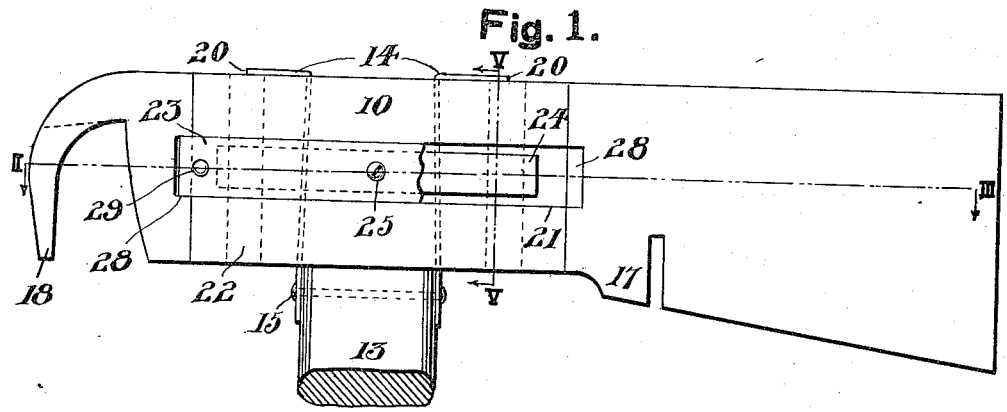
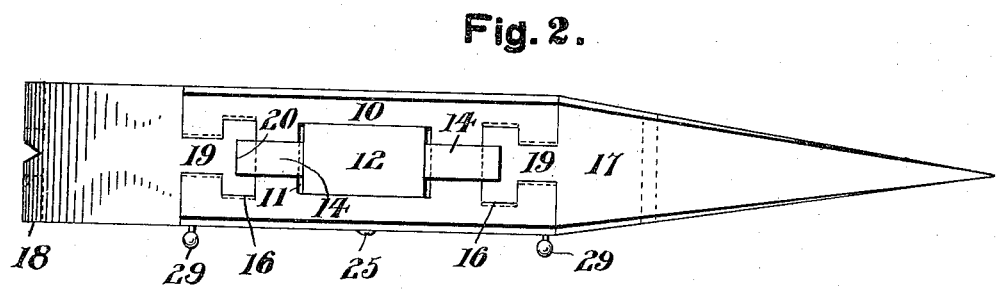
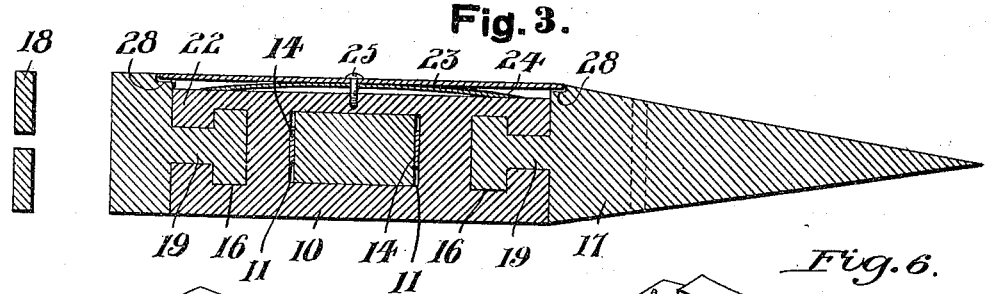
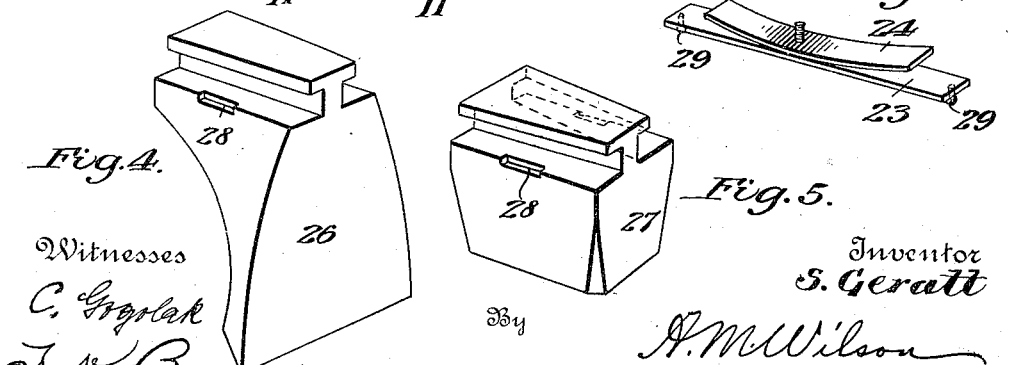
Witnesses
C. Grzelak
J. K. Bryant
Inventor
S. Geratt
By
A. M. Wilson
Attorney

UNITED STATES PATENT OFFICE.

STEPHEN GERATT, OF SUPERIOR, WISCONSIN.

COMBINATION IMPLEMENT-HEAD.

1,133,124.   Specification of Letters Patent.   Patented Mar. 23, 1915.

Application filed July 27, 1914. Serial No. 853,458.

*To all whom it may concern:*

Be it known that I, STEPHEN GERATT, subject of the Emperor of Austria-Hungary, residing at Superior, in the county of Douglas and State of Wisconsin, have invented certain new and useful Improvements in Combination Implement-Heads, of which the following is a specification.

This invention relates to new and useful improvements in combination implement head.

The primary object of this invention is to provide a head readily removable from the implement handle and being provided with different forms of detachable jaws and operating elements.

A further object is to provide a plurality of operative implement members for each end of a head member the same being readily attached thereto, and removed therefrom and retained in their operative positions by a spring catch arrangement.

A still further object is to provide an implement head with interchangeable jaws and operative elements which are positioned and arranged at will upon the opposite ends of the head.

With these general objects in view and others that will appear as the nature of the invention is better understood, the same consist in the novel combination and arrangement of parts hereinafter fully illustrated and described and pointed out in the appended claim.

In the drawings forming a part of this application and in which like-designated characters refer to corresponding parts throughout the several views, Figure 1 is a side elevation of the device with the handle broken away and a portion of the spring removed. Fig. 2 is a top plan view of the device. Fig. 3 is a central transverse sectional view taken upon the line III—III of Fig. 1. Figs. 4 and 5 are perspective views of different forms of removable end members for the implement head, and Fig. 6 is a perspective view of the spring latch detached.

Referring more in detail to the drawings, the implement head 10 is provided with a rectangular central opening 11 for receiving the attaching end 12 of the handle 13. Angular clips 14 are secured to the opposite edges of the handle end 12 as at 15 and project outwardly of the head 10, engaging the outer surface thereof, and thus prevent the removal of the handle from the head, excepting upon detaching the side clips 14.

The head 10 is provided with T-shaped slots 16 at each end thereof, which slots converge slightly toward the outer side or face of the head. Any desired form of implement members may be readily attached to the opposite ends of the head by providing such members with suitable tongues adapted for reception within the slots 16. The hatchet blade 17 and the claw 18 as illustrated in Figs. 1, 2, and 3 of the drawings are provided with T-shaped tongues 19 slightly tapered and slidably received within said slots 16. The clips 14 have their oppositely projecting ends 20 positioned outwardly of the slots 16 and thus prevent a passing of the tongues 19, outwardly of said slots, the tapering of the tongues and slots also preventing such removal by their wedging action.

A groove 21 is provided in one side face 22 of the head, and has a curved leaf spring 24 seated therein, which spring engages the side face at its ends as shown in Fig. 3. An outer plate 23 of greater length and width than the spring 24 is positioned exteriorly of the said spring and is fastened to the head 10 by a screw 25 passing through the plate and spring and engaging said head, with the plate tensioned by said spring.

The lathing edge or blade 26 and the hammer block 27 may readily replace the claw and hatchet blade or either of the same as desired, by removing the claw or blade illustrated in Fig. 1 and substituting either blade 26 or the block 27 as may be found desirable.

Each of the removable operative end members is provided with a side notch 28, and within which a projecting adjacent end of the top plate 23 is adapted to project when the end members are positioned operatively at the ends of the head. The plate 23 is provided with outwardly projecting knobs 29 at each end thereof, and whereby the carrying end of the plate 23 is readily gripped when the screw 25 is partially removed from the head and the spring 24 forces the plate 23 outwardly to release the ends of the plate from the notches 28, and which member being thereby released from the catch device formed of the spring may be readily slid from its slot 16 in a movement upon a line longitudinally of the handle 13, and toward the free end thereof. A serviceable implement is thus provided, having a combination head and in which the operative end member may be readily detached by releasing the catch device, and new ones substituted therefore at will, and when so assembled providing a serviceable implement head, while the handle member is removable therefrom when desired.

While the forms of the invention herein shown and described are what are believed to be preferable embodiments thereof, it is nevertheless to be understood that any minor changes may be made therein without departing from the spirit and scope of the invention as set forth in the claim.

What I claim is:—

A device of the class described comprising an implement head having a dove-tailed slot in each end thereof, implement members each having a tongue for sliding reception in said head slots, each of said members having a notch provided adjacent one edge, said head having a recess formed in one side face thereof, a leaf spring seated in said recess, a plate positioned outwardly of said spring, and a screw passing through said plate and spring engaging said head, the ends of the plate adapted to be seated in the said notches to hold the implement members stationary, said spring adapted to exert its force to move the plate outwardly of the head to free the ends of the plate from the notches in response to loosening of the screw.

In testimony whereof I affix my signature in presence of two witnesses.

STEPHEN GERATT.

Witnesses:
 GEO. C. COOPER,
 GUST KOMPAN.

Copies of this patent may be obtained for five cents each, by addressing the "Commissioner of Patents, Washington, D. C."